United States Patent
Brundridge

(10) Patent No.: US 6,279,109 B1
(45) Date of Patent: Aug. 21, 2001

(54) COMPUTING SYSTEM AND OPERATING METHOD FOR BOOTING AND RUNNING A GRAPHICAL USER INTERFACE (GUI) WITH R/W HARD DRIVE PARTITION UNAVAILABLE

(75) Inventor: Michael Brundridge, Georgetown, TX (US)

(73) Assignee: Dell U.S.A., L.P., Round Rock, TX (US)

(*) Notice: Subject to any disclaimer, the term of this patent is extended or adjusted under 35 U.S.C. 154(b) by 0 days.

(21) Appl. No.: 09/227,154

(22) Filed: Jan. 7, 1999

(51) Int. Cl.[7] .................................................... G06F 9/445

(52) U.S. Cl. ......................................................... 713/2

(58) Field of Search ................................................ 713/1, 2

(56) References Cited

U.S. PATENT DOCUMENTS

| | | |
|---|---|---|
| 5,490,260 | 2/1996 | Miller et al. . |
| 5,715,456 * | 2/1998 | Bennett et al. ............................ 713/2 |
| 5,918,048 * | 6/1999 | Mealey et al. ............................ 713/2 |
| 6,016,402 * | 1/2000 | Thomas et al. ....................... 713/2 X |
| 6,035,395 * | 3/2000 | Saito .......................................... 713/1 |
| 6,122,734 * | 9/2000 | Jeon .......................................... 713/2 |

FOREIGN PATENT DOCUMENTS

| | | | |
|---|---|---|---|
| 0 448 495 * | 9/1991 | (EP) | ............................... G06F/9/445 |
| 0 726 518 * | 8/1996 | (EP) | ............................... G06F/9/445 |
| 2 231 180 * | 11/1990 | (GB) | ................................ G06F/9/24 |
| 2 332 076 * | 6/1999 | (GB) | ............................... G06F/9/445 |

OTHER PUBLICATIONS

Pai Yili, "Pai Yili's Windows Help Pages: The Ramdrive Trick", http://www.users.fast.net/~paiyili/ramdrive.htm, pp. 1–2, Jul. 1998.

Pai Yili, "Pai Yili's Windows 95 Help Pages/Using a Ram-Drive in Windows 95", http://www.users.fast.net/~paiyili/95ramdrive.htm, pp. 1–2, Jul. 1998.

Intel®, "Net PC Quick Reference Guide", http://www.intel.com/buisinesscomputing/netpc/what.htm, pp. 1–3, Jul. 1998.

NeXTanswers "Apple Enterprise—NeXTranswers Support Archive", http://www.next.com/NeXTanswers/HTMLFiles/1381.htmld/1381.html, pp. 1–2, Jul. 1998.

(List continued on next page.)

Primary Examiner—Thomas M. Heckler
(74) Attorney, Agent, or Firm—Skjerven Morrill MacPherson LLP; Ken J. Koestner

(57) ABSTRACT

A computing system and operating method are executable on a target processor and bootstrap loads and run an application program or interface from an alternative medium, for example a CD-ROM medium or via a network link, when an operating system associated with the application program or interface is not installed on the target processor. For example, a computing system includes an executable program code or command entries that load and run a graphical user interface functionality when the operating system associated with the graphical user interface is not installed. The computing system typically includes a processor, a CD-ROM drive coupled to the processor, and a Random-Access Memory (RAM) Drive coupled to the processor. The executable program code or command entries substitute a designator of the RAM-Drive in place of predefined drive designators that are hard-coded into base code of the operating system. The executable program code or command entries disable various functionalities of the operating system that interfere with operating system operations arising from the RAM-Drive. The executable program code or command entries modify a registry in the operating system to permit storage of data on the RAM-Drive and to execute applications from an alternative source such as the CD-ROM drive or via a network link, for example.

36 Claims, 3 Drawing Sheets

OTHER PUBLICATIONS

Windows CE Overview, "Microsoft® Windows CE", http://www.microsoft/com/windowsce/basics/overview/default.asp, p. 1, Jul. 1998.

Windows CE Overview, "Developing Embedded Systems", http://www.microsoft.com/windowsce/embedded/basics/overview/default.asp, pp. 1–2, Jul. 1998.

Windows CE 2.0 Specifications, "Developing Embedded Systems", http://www.microsoft.com/windowsce/embedded/basics/overview/default3.asp, pp. 1–2, Jul. 1998.

Robert Starrett, "Writing Bootable CD–ROM: Try This At Home", CD–ROM Profeesional Aug. 1995, Copyright © Online, Inc.

* cited by examiner

COMPUTING SYSTEM AND OPERATING METHOD FOR BOOTING AND RUNNING A GRAPHICAL USER INTERFACE (GUI) WITH R/W HARD DRIVE PARTITION UNAVAILABLE

BACKGROUND OF THE INVENTION

A computer system is typically purchased and supplied as a combined hardware-software system. In the past, software was supplied via flexible (floppy) diskettes by manual loading, diskette-by-diskette, into a diskette drive by a purchaser. Memory and disk drive capacity have expanded and the size of software images has soared so that loading of software via flexible diskette has become very cumbersome. For example, the size of a typical software system image has grown to a range of 2 to 600 megabytes and is expected to continuing growing in the future. Thus a large number of flexible diskettes, for example on the order of 50 diskettes or more, are typically used to transfer a typical software system image.

To reduce the burden of software loading, many computer system suppliers have replaced flexible diskettes with high-capacity compact disk (CD) ROMs for supplying software images. Typically, computer system suppliers that supply software on CD ROMs only sell a limited number of hardware configurations (for example 4 to 8) that utilize even fewer software configurations (for example 2 or 3). The software system generally includes a common operating system, a graphical user interface (GUI), hardware drivers, software utilities, and application programs for usage among computer systems having various hardware configurations. Software system components are chosen from a multitude of software selections generally based on the applications performed by the computer system. Performance of a computer system configuration, including both hardware and software functionality, depends upon allocation of various hardware resources including control, communication, and storage resources to multiple software tasks.

One problem that arises in computer systems relates to compatability of various software resources in a particular hardware configuration. For example, a computer user may wish to run an application program or graphical user interface that generally runs on an operating system that is not installed on the computer system. In one specific example, a user may wish to bootstrap load a Microsoft® Windows™ Graphical User Interface (GUI) when the Windows Operating System (OS) is not installed on a target system. The user may wish to use the Windows GUI to perform operations that do not otherwise utilize or need the full Windows OS functionality, operations including displaying HTML documents, running diagnostics, and executing system setup programs.

The described resource conflict arises when a non-Windows operating system, such as Unix, Lynx, NetWare®, Banyan, or other Intel Corporation (Santa Clara, Calif.) based operating system, is installed on a target computer system and a user attempts to run a software application that uses or requires Windows OS functionality.

What is needed is a system and operating method that bootstrap loads and runs a graphical user interface (GUI) from CD-ROM when a read/write hard drive partition of an operating system is unavailable.

SUMMARY OF THE INVENTION

Dell Computer Corporation™ advantageously offers to customers a high level of versatility in selecting a hardware and software configuration for computer systems while avoiding difficulties in software-hardware system integration by "custom" building each computer system to order. A customer orders a computer, specifying particular hardware subsystems and software packages. The software-hardware integration, including installation of particular drivers for the hardware that is installed in fulll native mode in the computer, is performed in the factory by Dell Computer Corporation, tested, and assured of compatibility before the combined system leaves the factory. The software is thus assured to operate with the particular ordered hardware system and also assured to operate in conjunction with particular drivers and the operating system.

One consequence of the build-to-order business model is that each software load is potentially unique. A particular software load may include applications or interfaces that are not supported by the operating system installed in the computer system. Dell Computer Corporation advantageously supports versatility in software configuration of a computer system by incorporating a system and operating method for bootstrap loading and running a graphical user interface from CD-ROM in a computer system for which a read/write hard disk drive partition is unavailable.

What has been discovered is a computing system and operating method that are executable on a target processor and bootstrap loads and runs an application program or interface from an alternative medium, for example a CD-ROM medium or via a network link, when an operating system associated with the application program or interface is not installed on the target processor, and/or no writable magnetic media is present.

In a particular example, a computing system and operating method bootstrap load and run a Microsoft Windows 95 graphical user interface (GUI) although a Windows operating system (OS) may or may not be installed on the target processor.

In accordance with an embodiment of the present invention, a computing system includes an executable program code or command entries that load and run a graphical user interface functionality when the operating system associated with the graphical user interface may or may not be installed. The computing system typically includes a processor, a CD-ROM drive coupled to the processor, and a Random-Access Memory (RAM) Drive coupled to the processor. The executable program code or command entries substitute a designator of the RAM-Drive in place of predefined drive designators that are hard-coded into base code of the operating system. The executable program code or command entries disable various functionalities of the operating system that interfere with operating system operations arising from the RAM-Drive. The executable program code or command entries modify a registry in the operating system to permit storage of data on the RAM-Drive and to execute applications from an alternative source such as the CD-ROM drive or via a network link, for example.

The described computer system obviates a requirement imposed on and by the operating system for persistent magnetic read/write storage media. The operating system conventionally uses the persistent magnetic (hard disk) medium to write the operating system registry, swap files, create and use temporary files, create and use log files, create and use a browser cache, browser cookies, browser most recent data, and browser favorite data the described computer system redirects the operating system to use the RAM-Drive rather than the persistent magnetic storage for the various operating system functions.

BRIEF DESCRIPTION OF THE DRAWINGS

The features of the described embodiments are specifically set forth in the appended claims. However, embodiments of the invention relating to both structure and method of operation, may best be understood by referring to the following description and accompanying drawings.

DETAILED DESCRIPTION OF THE EMBODIMENTS

A software system supports bootstrap loading of a first operating system, for example a Windows 95 operating system, on a processor via a network server even though the processor is running a second operating system, for example the Unix operating system, that does not allow writing to persistent storage by the first operating system. The software system avoids the constraint against writing to the persistent storage by creating and utilizing a RAM-Drive.

Typically, the software system invokes the first operating system to provide a functionality that is not supported by the second operating system, although the second operating system is the primary operating system in use on the processor. For example, a NetWare® operating system has many usefull attributes but may not support a Web browser or the ability to run hardware configuration tools written to run only in DOS or Windows. A Web browser may be desired to display HELP files, documents, and the like. A Windows supports the Web browser. The software system is useful for temporarily invoking the Windows system for usage of the Web browser while the NetWare® operating system remains installed.

Figure 1:
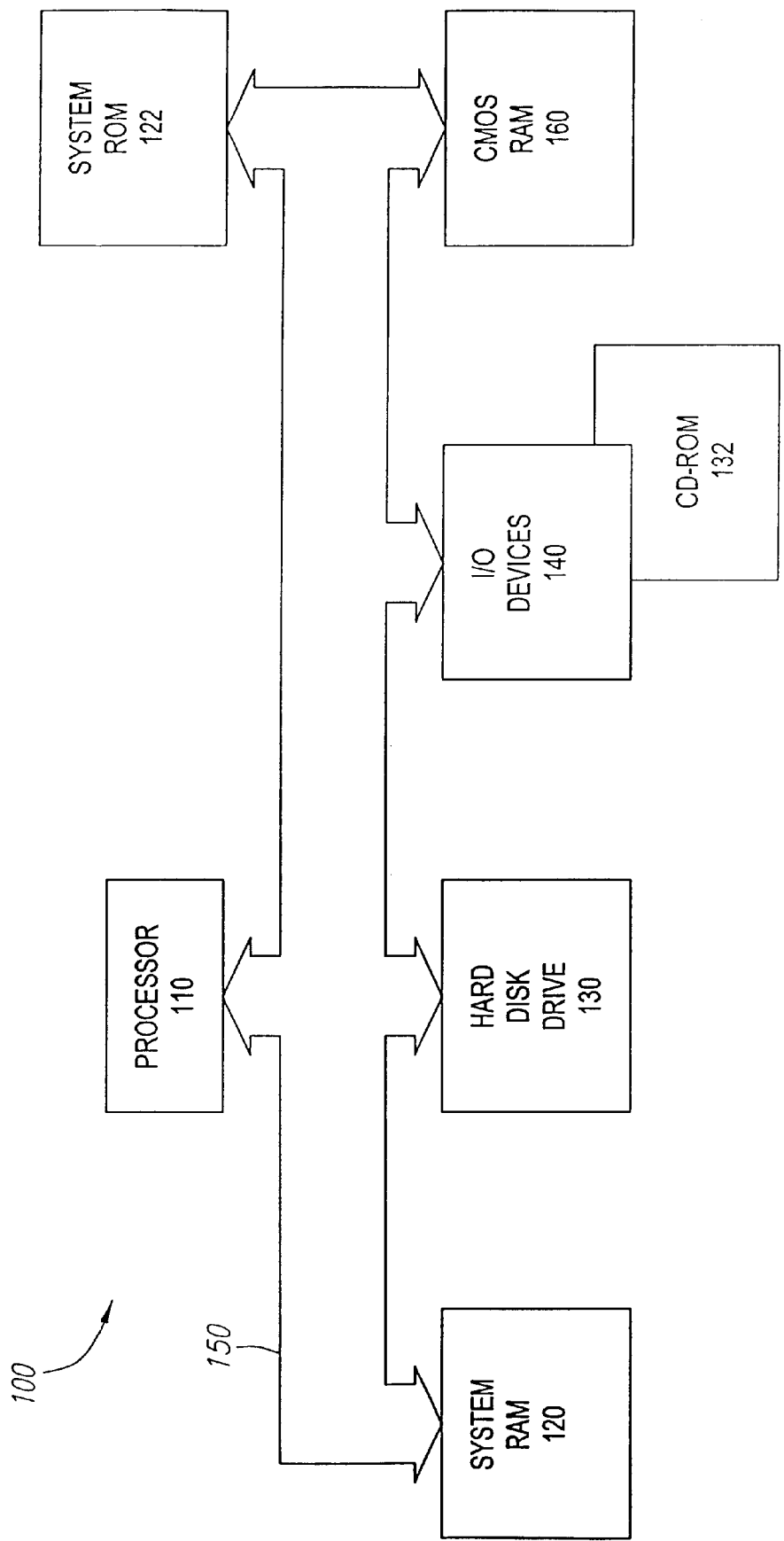
FIG. 1 is a block diagram which depicts computer system hardware implementing a method for building a bootable operating system compact disk (CD) for use with a computer system with or without a hard disk drive installed and formatted.

Referring to FIG. 1, a computer system 100 is shown that is suitable for implementing a method for building a bootable operating system compact disk (CD) for use with a computer system with or without a hard disk drive installed and formatted. The computer system 100, typically a personal computer, includes a processor 110, a system random access memory (RAM) 120, a system ROM 122, a CD-ROM drive 132, and various other input/output devices 140. The computer system 100 is shown to include a hard disk drive 130 connected to the processor 110 although some embodiments do not include the hard disk drive 130. In particular, an illustrative method for building a bootable operating system compact disk (CD) for use with a computer system with or without a hard disk drive installed and formatted is usefull when the computer system 100 either does not include a hard disk drive 130 or the hard disk drive 130 does not have an operating system, for example the Windows operating system, installed on the hard disk drive 130.

The processor 110 communicates with the system components via a bus 150 which includes data, address and control lines. A CMOS clock nonvolatile RAM 160, which is connected to the processor 110 via the bus 150, is typically utilized to store information even when power to the computer system 100 is interrupted. Program instructions that make up the system for creating an operating system independent environment are stored in a storage device such as the hard disk drive 130 or the system ROM 122 connected to the processor 110. The processor 110, for example an x86 processor such as a 486, 586 or Pentium™ processor, executes the computing operations of the computer system 100.

Figure 2:
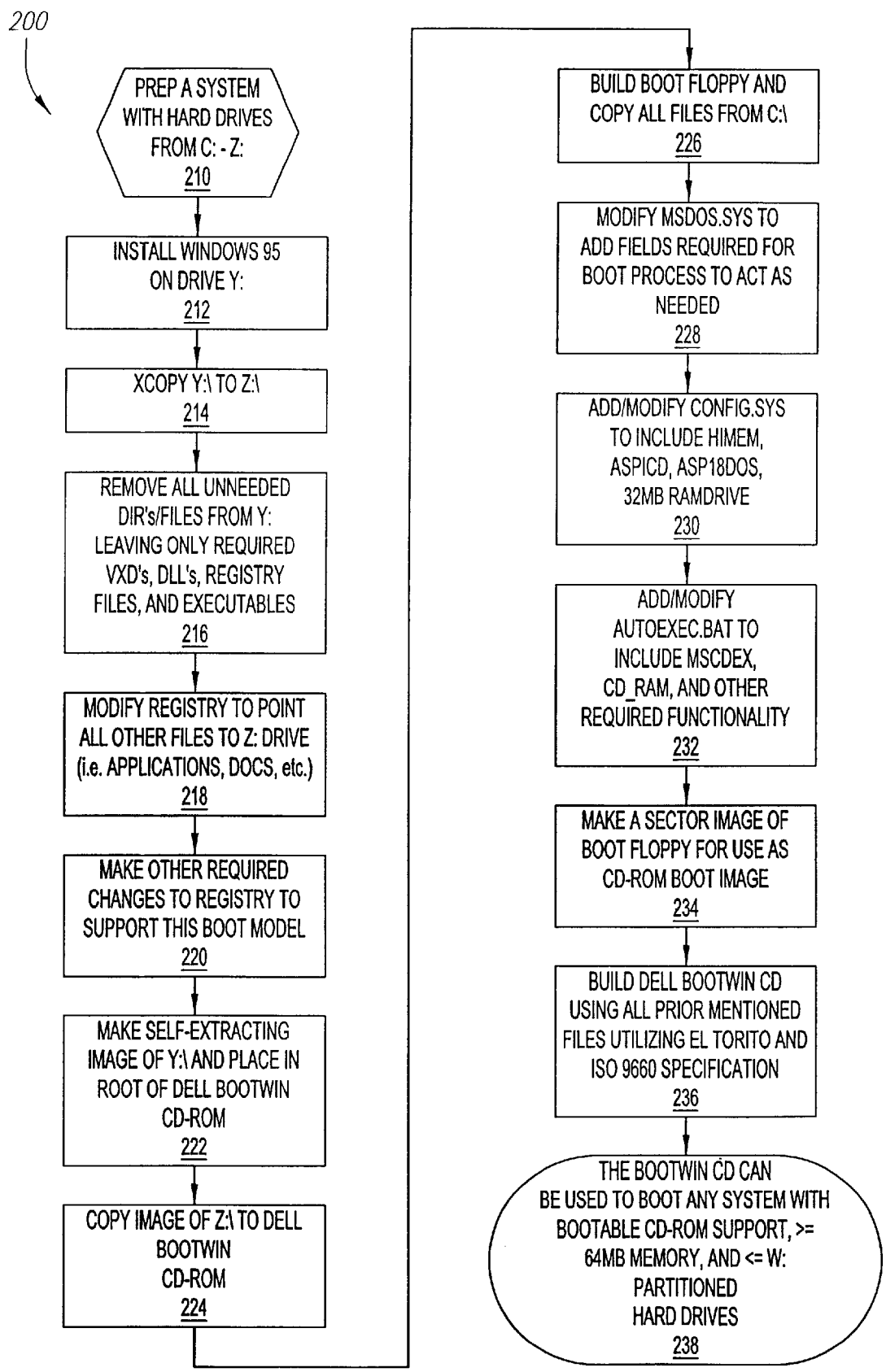
FIG. 2 is a flow chart showing an embodiment of a method for building a bootable operating system compact disk (CD) for use with a computer system with or without a hard disk drive installed and formatted.

Referring to FIG. 2, a flow chart shows an embodiment of a method 200 for building a bootable operating system compact disk (CD) for use with a computer system 100 shown in FIG. 1 with or without a hard disk drive installed and formatted. The method 200 is utilized in a computing system that is executable on a target processor 110 in which an executable program code, typically in a command file, or a set or command entries made by a system user bootstrap loads and runs an application program or interface, such as a graphical user interface (GUI), from a CD-ROM medium read via a CD-ROM drive 132 when an operating system associated with the application program or interface is not installed on the target processor 110.

In a particular example, a computing system and operating method 200 bootstrap load and run a Microsoft Windows 95 graphical user interface (GUI) when the Windows operating system (OS) is not installed on the target processor 110. When the Windows operating system is installed on the target processor 110, the processor is conventionally required to have a hard disk drive upon which is configured with an operating system registry and operating system partitions. However, some computer systems do not have the Windows operating system installed on a hard disk drive or do not have a hard disk drive for installing the Windows operating system.

The illustrative method 200 operates on a computer system 100 that includes a target processor 110 and a system memory including a system random access memory (RAM) 120. The target processor 110 is connected to various peripheral devices including storage devices such as a CD-ROM drive 132. The method 200 involves loading and running a graphical user interface (GUI) functionality when the operating system associated with the Gull is not installed on a hard disk drive.

The executable program code or command entries create a RAM-Drive 122 on the system random access memory (RAM) 120 then substitute a designator of the RAM-Drive 122 in place of predefined drive designators that are hard-coded into base code of the operating system. The RAM-Drive 122 is configured to use part of the random access memory (RAM) in the system memory to simulate a hard disk drive. The RAM-Drive 422 is made operable by loading a device driver using a DEVICE or DEVICEHIGH command in a CONFIG.SYS file. RAM drives are much faster than a hard disk drive since read and write operations are much faster to RAM than to a drive. To other components in a computer system, a RAM drive is functionally equivalent to a hard disk drive. Since the RAM-Drive 422 is a virtual entity that exists in memory, all stored information is lost when power to the processor 110 is terminated or restored. A user may set up a plurality of RAM drives within the constraints of the system memory. A RAM drive is created using a virtual device creation command with a syntax as follows:

DEVICE=[drive:][path]RAMDRIVE.SYS [Disksize SectorSize [NumEntries]][/E|/A]

where the parameters [drive:] and [path] specify the location of the RAMDRIVE.SYS file. Disksize specifies the size of the RAM drive in kilobytes of memory. SectorSize specifies the disk sector size in bytes. NunEntries limits the number of files and directories that may be created in the root directory of the RAM drive. The switch /E creates the RAM drive in extended memory. For RAM drive to use extended memory, the computer system is configured to support extended memory, and a DEVICE command for an extended memory manager, such as HIMEM.SYS, is to appear in the CONFIG.SYS file before the DEVICE command for RAM-DRIVE.SYS. The switch /A creates the RAM drive in expanded memory. For RAM drive to use expanded memory, the computer system is configured to support expanded memory, and a DEVICE command for an expanded memory manager, such as EMM386, 386MAX, CEMM, or QEMM, is to appear in the CONFIG.SYS file before the DEVICE command for RAMDRVE.SYS.

The executable program code or command entries disable various functionalities of the operating system that interfere with usage of the RAM-Drive 122 to supply storage of data structures used in operating system operations. The executable program code or command entries modify a registry in the operating system data structures to penrit storage of data on the RAM-Drive 122 and to execute applications from a CD-ROM seated in the CD-ROM drive 132.

In the illustrative embodiment of the operating method 200, several operating system functionalities are disabled by the executable program code. The functionality of auto-detecting hardware is disabled in some systems. The functionality of preloading the operating system registry at boot time may be selectively disabled. In some systems, the functionality of the operating system to write boot log files to a boot media is disabled. Some executable program codes disable the functionality of allowing an end user to use function keys to change the bootstrap process. The disabling of various other functionalities may otherwise be suitable.

Many conventional operating systems, including the Windows operating system, require the usage of a persistent magnetic read/write storage medium such as a hard disk drive to supply control parameters and data structures during operating system operations. Persistent storage generally refers to hard disk drives, flexible diskette drives, and the like which are both readable and writable. Conventional operating systems, such as the Windows operating system, conventionally uses the persistent magnetic (hard disk) medium to write the operating system registry, swap files, create and use temporary files, create and use log files, create and use a browser cache, browser cookies, browser most recent data, and browser favorite data. The described operating method 200 for operating a computer system 100 avoids the hard disk drive requirement by redirecting the operating system to use the RAM-Drive 122 rather than the persistent magnetic storage for the various operating system functions.

The illustrative method 200 or technique for loading and running graphical user interface functionality when the operating system associated with the graphical user interface is not installed advantageously expands the functionality of the computer system. For example, the technique allows the display of technical, system, and peripheral documents in an HyperText Markup Language (HTML) format. The technique enables design and execution of graphical setup programs for various peripherals including Redundant Array of Inexpensive Disk (RAID) controllers. The technique enables execution of hardware and software diagnostics written to run under the DOS and Windows operating systems platforms. The technique is further usefuel for designing a database for driver tracking and updating. Building of driver diskettes is another useful application of the technique. The technique is particularly suitable for various applications utilizing normal Microsoft C++ practices. The technique is generally advantageous for performing any applications that are performed in either a Windows 95, the Windows 98, or a DOS environment when such an environment is not installed on the target system The illustrative method 200 or technique for loading and running graphical user interface functionality when the operating system associated with the graphical user interface is not installed advantageously performs a plurality of functions concurrently due to the use of a Multitasking environment, unlike conventional server assistant applications that operate overlying the DOS environment. The conventional server assistant typically allows a user to boot to a DOS environment to enable a GUI front end invoking a functionality that builds driver diskettes, views Adobe Acrobat™ documents, and run DOS-only diagnostics.

A general embodiment of the illustrative method 200 for building a bootableoperating system compact disk (CD) includes general operations of installing an operating system on the hard disk drive 130, then using a file management tool to move files that are to be accessed from a CD-ROM to another directory structure so that the underlying registry of the operating system is appropriately modified. The moved files are subsequently recorded onto a CD-ROM medium to create a bootable CD-ROM. The files to be accessed from the CD-ROM include Dynamic Link Libraries (DLL), drivers, and other files that are suitably accessed from a read-only medium. The file management tool is then used to remove unnecessary operating system files and to configure a CD-ROM bootable operating system that includes only a base operating system.

In a specific embodiment of the method 200, a Windows 95 or the Windows 98 operating system is installed on the hard disk drive 130 and the Windows Explorer file management tool is used to move operating system files that are to be accessed from the CD-ROM. The CD-ROM that is subsequently configured is used for bootstrapping the Windows 95 or the Windows 98 operating system when the hard disk drive 130 is eliminated or the hard disk drive 130 is configured to run another operating system such as, Unix, Lynx, NetWare®, Banyan, or other Intel Corporation (Santa Clara, Calif.) based operating system. The Windows Explorer is a shell function that enables a user to browse files, folders, and other resources. The Windows Explorer is used to move the DLLs and the drivers that are known to be read-only, and thus suitably stored and utilized on the CD-ROM, to an alternative directory for the purpose of modifying the registry of the operating system. The alternative directory is typically on the hard disk drive 130 or other suitable storage. The Windows Explorer is then used to purge or remove unnecessary files, such as a file manager and other operating system tools that are usefwll only in support of hardware and software functionality that are not active in the target computer system configuration. When the unnecessary files are purged, only the base operating system remains.

In the general embodiment of the method 200, the file management tool then changes configuration of the operating system to point to a different root storage device. In the specific illustrative example, the Windows Explorer is used to change the drive pointer of the operating system registry. For example, the drive pointer for a DLL directory of DLLs that are to be accessed from the CD-ROM drive 132 in a bootable CD-ROM configuration are changed to designate the CD-ROM drive 132 as the DLL storage device. In a typical Windows system, the DLL directory and storage is located on the "C:" drive of the hard disk drive 130. In an illustrative embodiment, the DLL directory and storage is moved to the CD-ROM drive 132 which may be designated a "Z:" drive so that all registry references to "C:\windows\system" are converted to "Z:\windows\system".

The alternative directory containing the moved operating system elements including DLLs and drivers is copied or otherwise transferred to a CD-ROM. Typically, the CD-ROMs containing the operating system image are programmed using mass programming techniques, although any suitable technique for encoding CD-ROMs may be utilized.

The method 200 may be practiced using manual techniques by entering commands to a computer system. Alternatively, the method 200 may be practiced through an executable program code such as through the operation of a command file or through execution of any suitable programming code. In other embodiments, the method 200 may be performed by downloading or transferring of information and commands over a network or other communication link.

The method 200 is particular advantageous as applied in the Build-to-Order business method of Dell Computer Corporation. A conventional method for installing an operating system on a computer system involves using of a DOS operating system to install software, run diagnostics, and configure utilities. The method 200 improves the installation of software and configuration of the computer system by creating a bootable image and transferring the bootable image on an alternative bootable medium. A CD-ROM is a highly suitable medium for storing the bootable image. Similarly, the bootable image may be supplied via a communication link such as a network link.

A computer system that runs based on a bootable image accessed from an alternative device (other than a hard disk drive) is highly advantageous in a manufacturing environment, including a Build-to-Order environment for several reasons. Multiple diverse operations are included in the configuration of a computer system. Usage of a bootable image accessed by a processor via the CD-ROM or network communications more suitably allows multithreaded operation rather than conventional serial operation. Multithreaded operation advantageously allows multiple diagnostic tests to be performed on the computer system concurrently and installation of multiple applications simultaneously.

The method 200 for building a bootable operating system CD begins with an operation of preparing a system with hard disk drives for multiple-partition usage 210 by defining a plurality of hard disk drives. In an illustrative embodiment, virtual drives "C:" through "Z:" are defined and assigned drive letters in alphabetical order.

Following preparation of the drives in operation 210, the method 200 includes installing the operating system 212, for example Windows 95 or Windows 98, on one of the virtual drives, illustratively drive "Y:". In embodiments of the method 200 in which the operating system is a Windows operating system, the operating system is installed using conventional and normal Microsoft procedures. In the illustrative example, the operating system is installed on drive "Y:" because the operating system registry has several strictly defined, hard-coded drive letters, typically beginning at drive "C:" and extending in alphabetical order for each of the hard disk drives connected to the computer system. Thus, a system including ten hard disk drives uses drive letters "C:" through "N:" inclusively. However, at the time of installation, the number of hard disk drives that are ultimately connected to the computer system is not known. Therefore, drive letters that are late in the alphabetical sequence are selected for usage in creating a bootable operating system image that operates from a non-persistent magnetic storage medium. In the illustrative embodiment, drives for building a bootable image on an alternative medium are allocated, somewhat arbitrarily, so that all operating system elements with persistent storage are assigned to drive "Y:" and all operating system elements that do not have persistence, such as DLLs and applications, are assigned to drive "Z:". The drive "Z:" is allocated to the alternative storage, for example the CD-ROM.

The operating system directory, illustratively the drive "Y:" directory is then copied to an alternative directory 214 that is subsequently assigned to the alternative medium, the CD-ROM. Illustratively, the operating system directory is copied to the alternative directory using an XCOPY command or using the Windows Explorer. The copying of the data structures creates a modified registry for usage during operation with the bootable alternative medium and creates an image for transfer to the alternative medium. In an further example, the operation of copying the operating system directory to an alternative directory 214 is replaced by installing a RAM-Drive, for example in drive "E:" and using a substitute command to equate the RAM-Drive ("E:") to the drive "Y:".

The operations of preparing a system with hard disk drives for multiple-partition usage 210, installing the operating system 212, and copying the operating system directory to an alternative directory 214 create an operating system image that is subsequently transferred to an alternative medium, for example the CD-ROM. Other embodiments may utilize a different alternative medium, including communication of the operating system image over a communication line, for example over a network.

After the operating system elements are copied to the alternative directory, unnecessary directories and files are removed from the "Y:" drive in an operation 216, leaving only virtual device drivers (VxDs), DLLs, registry files, and desired executables that are required on a read/writable media by designation of operating system design.

Unnecessary directories and files include, among others, program manager, Chkdsk, and the like. Directories and files are typically removed based on selection of applications that are to be omitted from the computer system, omitting unwanted applications, conserving storage space, and reducing software costs.

Underlying the operation 216 of removing unnecessary directories and files is a determination of which directories and files are unnecessary. Various software elements including drivers, DLLs, and executable codes are necessary simply to allow the operating system to bootstrap load into a basic operational configuration. Furthermore, some of the software elements may be stored in a persistent (read-only (storage), but other elements must be stored in a rewritable storage.

A determination of which directories and files are necessary and which must be stored in a rewritable storage is performed may be performed using various techniques. In one example, directories and files are classified based on knowledge of functionality. In another example, the directories and files are classified using trial and error techniques, in which files are selectively removed and bootstrap loading is attempted to determine whether the directories and files are necessary. In a further example, an utility such as Explorer has a "properties" functionality that lists known attributes of files and occasional text descriptions relating functionality of the file. In another example, the name, acronym, or naming convention of a file is analyzed to suggest functionality. Other techniques involve combining several techniques.

One technique for determining which files an directories are used during bootstrap loading is to load the entire Windows operating system then perform a general delete (*.*). Windows locks the drivers and DLLs that are currently open to prevent deletion. A subsequent attempt to reboot permits determination of whether a file crucial to bootstrap loading was deleted and must be restored.

In an operation 218, the registry is modified to point all other files, such as applications, documents, and the like, to the "Z:" drive. One technique for modifying the registry is to use Windows Explorer to drag and drop selected files to the "Z:" drive, thus modifying the operating system registry.

The operations of copying the operating system directory to an alternative directory 214 and modifying the registry 218 enable the operating system, which is hardcoded to access a particular hard-coded device (generally the "C:" drive) to redirect accesses to the RAM-Drive. Copying the operating system directory 214, for example using a "substitute" command, substitutes a drive letter designating the RAM-Drive for a conventional drive letter such as "C:" designating the persistent magnetic storage medium. Modifing the registry 218 replaces the drive letters specifying the RAM-Drive for drive letters specifying the persistent magnetic storage medium in the registry.

In an operation 220, any other desired changes are made to the registry to support the bootable image on an alternative medium. Typically the other desired changes involve modifications to pointers and references that are hard-coded to access the "C:" drive. One technique for making the changes is to search the registry to detect references "C:\" and manually changing the references to other suitable drives, typically the :Y" drive or the "Z:" drive. Another technique is to create a macro operation that converts the reference pointers.

The operations of removing unnecessary directories and files from the "Y:" drive 216, modifying the registry to point all other files to the "Z:" drive 218, and changing the registry to otherwise support a bootable image on an alternative medium modify directories to deflect bootstrapping from the persistent magnetic storage medium to an alternative bootable medium.

An operation 222 makes a self-extracting image of the "Y:" directory and places the image in a root location of a Boot windows (BOOTWIN) CD-ROM. The image in the "Y:" directory is used in operation of the bootable image on the CD-ROM as the image that is transferred to the RAM-Drive during bootstrap loading and executes from the RAM-Drive following bootstrap loading. Later, during bootstrap loading, the self-extracting image on the CD-ROM extracts onto the RAM-Drive, which takes the designation of the "Y:" drive. In one technique, the image on the "Y:" drive is transferred to the CD-ROM using ZIP technology that is known in the software arts.

An operation 224 copies an image of the "Z:" directory to the BOOTWIN CD-ROM so that the CD-ROM now stores both the persistent bootable image and the non-persistent bootable image. The CD-ROM contains the entire operating system image including the self-extracting files that are later transferred to the RAM-Drive on bootstrap loading, the persistent files that are accessed from the CD-ROM when the operating system runs from the non-persistent magnetic storage medium. Some of the files reside on the El Torito boot partition of the of the CD-ROM, including files that execute functions 310 to 338 referenced in FIG. 3 but excluding the selfextracting file listed in operation 336 which resides on the ISO 9660 partition of the compact disk with files from the "Z:" drive.

The operation 224 copies the bootable image to the CD-ROM in an uncompressed, completely operational binary state. The bootable image is read from the CD-ROM at the CD-ROM drive location while the operating system is executing. Drivers that are stored in the RAM-Drive are accessed by the operating system as needed during boot-up.

The operations of making a self-extracting image of the "Y:" directory and placing the image in a root location of a Boot CD-ROM 222 and copying an image of the "Z:" directory to the Boot CD-ROM 224 create both a persistent bootable image and a non-persistent bootable image on the CD-ROM.

In an operation 226 a boot flexible disk is created and operating system boot files are copied to the boot flexible disk. In a typical Windows operating system, the boot files are located in the "C:" directory. The operating system boot files typically include, among others, CONFIG.SYS, AUTOEXEC.BAT, COMMAND.COM, IO.SYS, MSDOS-.SYS and the like. The boot flexible disk is subsequently used to make the alternative boot image on the CD-ROM.

In an operation 228 an operating system control file is modified to set data fields that control the bootstrap process. In the illustrative example of a Windows operating system, an MSDOS.SYS file is modified to add control data fields that are used for the bootstrap process to function as desired. MSDOS.SYS is a text file that contains initialization commands and header information directing the bootstrap loading operation.

Operation 230 adds or modifies a system configuration file to load various aspects of operating system behavior by setting limits on resources, selecting device drivers, and the like. In the example of a Windows operating system, operation 230 adds or modifies CONFIG.SYS to include HIMEM to expand memory, ASPICD to subsequently load the CD-ROM drive, ASPI8DOS to load a selected controller, and load a 32 MB RAM—Drive. In one example, ASPI8DOC loads the controller in a SCSI CD—ROM configuration. Any driver that supports a CD-ROM drive on the target system can be substituted for the listed drivers. All possible CD-ROM drivers may be loaded if wanted in multiple target configurations.

The operation 230 deletes Windows functionalities that are burdensome, bothersome or otherwise unnecessary. The only Windows functionalities that are highly desirable in an operating system that bootstrap loads from an alternative source are GUI functions and drivers for the alternative source, for example the CD-ROM drive. For example, the conventional operating system, such as Windows, when bootstrap loaded on a "new" system or a system for which the operating system does not have a configuration, will attempt to auto-detect any connected hardware peripherals. Generally, the Windows operating system includes a control panel program (sysdm.cpl) that queries the user regarding hardware peripherals that are found during auto-detection to determine whether the user wishes to load a driver for the auto-detected hardware peripherals. The operation 230 deletes the control panel program to avoid auto-detection of devices since configuration of peripherals such as audio cards, DVD drives, modems, and the like may be unnecessary and burdensome in a system that does not utilize all of Windows functionality. Deletion of the control panel program does not otherwise harm performance of the computer system.

Operation 232 adds or modifies a special-purpose batch file that is automatically run at computer startup to include support for an alternative bootable medium. In the Windows operating system example, operation 232 adds or modifies AUTOEXEC.BAT to support bootstrap loading from a device such as a CD-ROM or a plurality of signals communicated via network link. In the illustrative method 200, AUTOEXEC.BAT is added or modified to include MSCDEX, the Microsoft CD extensions that assign a drive letter to the CD-ROM drive so that the CD-ROM drive appears to be identical to a hard disk drive in the operating system context. MSCDEX assigns a drive letter to the CD-ROM drive and allows DOS to access file on the CD-ROM. AUTOEXEC.BAT is further modified to execute CD-RAM which searches for the RAM-Drive and, when found, passes the drive letter of the RAM-Drive to an environment variable that is used during bootstrap loading to access the RAM-Drive. AUTOEXEC.BAT is also modified to support other bootstrap loading functionality such as loading memory-resident software (terminate-and-stay-resident TSR) programs and passing the drive letter of the CD-ROM Drive to an environment variable for subsequent usage in accessing the CD-ROM Drive.

The operations of modifying an operating system control file to set data fields controlling the bootstrap process 228, modifying a system configuration file to load various aspects of operating system behavior 230, and modifying a special-purpose batch file to include support for an alternative bootable medium 232, in combination, modify startup files to support bootstrap loading from an alternative device.

In operation 234, a sector image of a boot flexible diskette is made for use as a CD-ROM bootstrap image using a utility tool that reads the flexible diskette and writes a sector image of the flexible diskette into a file that is subsequently transferred to a CD-ROM. One example of a utility tool that creates a sector image of the flexible diskette is an Adaptec™ CD-ROM writer software according to a bootable CD specification. One example of a bootable CD specification is an El Torito specification. El Torito is a utility jointly developed by Phoenix Technologies and IBM that allows BIOS to load COMMAND.COM or a command interpreter for another operating system on a drive that is recognized by the BIOS. The El Torito specification defines how a boot image or images is to be physically placed on the CD-ROM.

In a final operation 236 of the method of building a system that is bootable from an alternative source, the bootable CD-ROM is created (written) that includes the aforementioned persistent bootable image files and a non-persistent bootable image files. The bootable CD-ROM CD is created using bootable CD-ROM specifications, for example including the El Torito and ISO 9660 specifications. In a typical Windows operating system, the persistent bootable image files and the non-persistent bootable image files are both copied from the "C:" drive of a computer system along with the files copied from the Z: drive, approved CD-ROM writer code from the sector image copy of the flexible diskette, and specification (El Torito) approved CD-ROM writer code. A CD-ROM con ig the specified data structures is bootable.

The bootable CD-ROM is subsequently distributed an d used 238 by a user to boot any computer system having bootable CD-ROM support. In one example, bootable CD-ROM support is limited to implementation on computer systems having at least 64 Mbyte of memory and having partitioned DOS hard disk drives installed no farther than the "W:" drive (fewer than 23 drives). Note that the system is not otherwise resourcelimited. For example, a system may have several Unix disk drives or Windows NT™ file system NTFS partitions.

Figure 3:
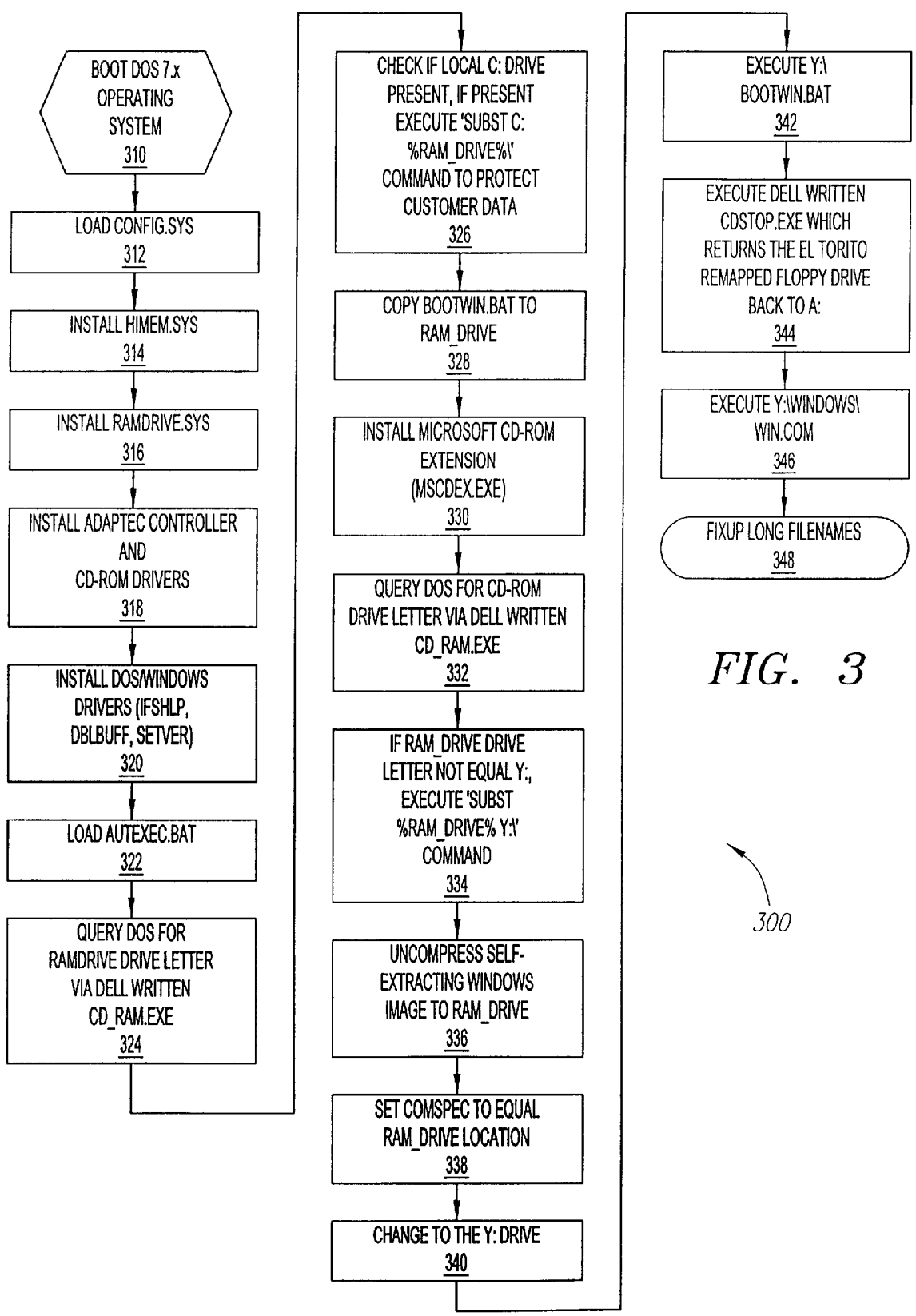
FIG. 3 is a flow chart that illustrates an embodiment of a boot CD process flow.

Referring to FIG. 3, a flow chart illustrates an embodiment of a boot CD process flow 300, describing the process performed by a computer system when bootstrap loaded by the CD-ROM. The process flow 300 begins by booting the operating system 310. In an illustrative system, the DOS 7.x operating system, a part of the Windows 95 operating system, is bootstrap loadend. During loading, the processor 110 loads the CONFIG.SYS file 312 from the bootable CD-ROM to enable or disable system features, set limits on resources, and extend the operating system by loading device drivers and control hardware specific to the computer system 100.

The processor 110 then installs operating system control structures, files, controllers, drivers, and the like. In particular, the processor 110 installs HIMEM.SYS 314 from the CD-ROM to configure memory, and installs RAM-DRIVE.SYS 316 from the CD-ROM to create a 32 MByte RAM-Drive. The processor 110 installs a controller and CD-ROM drivers in operation 318. In a illustrative system, when the last drive letter has not been used by DOS, the processor 110 defaults to installing the Adaptec controllers and the CD-ROM drivers. The processor 110 installs operating system drivers in operation 320. In the illustrative system, the processor 110 installs DOS and Windows drivers including, for example, installable filesystem HELP, IFSHLP, and set version SETVER in operation 320. Other drivers may be installed in other embodiments, such as a double buffer DBLBUF driver.

In operation 322, the processor 110 loads the special-purpose batch file from the CD-ROM. In the illustrative system, the processor 110 loads the AUTOEXEC.BAT file from the CD-ROM.

In operation 324, the processor 110 queries the boot operating system to determine the drive letter for the RAM-Drive. In particular, the processor 110 queries DOS using a CD-RAM executable code which checks to determine the assigned drive letter of the RAM-Drive, then saves an identifier of the RAM-Drive letter for subsequent usage. In operation 326 the processor 110 determines whether a local "C:" drive is present. If the "C:" drive is present, the processor 110 protects the "C:" drive to prevent accidental writing of the "C:" drive by legacy operating system code that includes hard-coded specification of the "C:" drive. Protection of the "C:" drive protects against overwriting of user data by the legacy operating system code. The protection operation substitutes the drive letter directed to the RAM-Drive for the "C:" drive specification in the legacy operating system code. In this manner, the "C:" drive is no longer accessible and is not accidentally written.

In operation 328, the processor 110 copies a batch file for bootstrap loading the operating system to the RAM-Drive location. In the illustrative system, the processor 110 copies a BOOTWIN.BAT file to the RAM-Drive. The processor 110 installs the Microsoft CD-ROM extensions in operation 330, thus assigning a drive letter under DOS for the CD-ROM drive.

In an operation 332, the processor 110 queries the low level operating system to determine which drive letter is assigned to the CD-ROM drive using a CD-RAM executable file. A response to the query is returned to the DOS environment that is subsequently used. The processor 110 checks the RAM drive letter by executing CD-RAM to determine whether the response correctly matches the RAM-Dnve letter coded in the registry. If the RAM-Drive letter is not equal to "Y:", as determined by logic operation 334, the computer system executes a substitute drive command. The RAM-Drive is not equal to "Y:" if the computer system does not have drives assigned up to and including the "X:" drive letter. The substitute drive command substitutes whichever RAM-Drive letter is current assigned to the RAM-Drive for the driver letter "Y:", thus equating the RAM-Drive to the "Y:".

In an operation 336, the processor 110 uncompresses a self-extracting operating system image to the RAM-Drive. In an illustrative system, the compressed operating system image is a self-extracting ZIP image that was originally constructed on the "Y:" drive for usage on the RAM-Drive. The self-extracting program code is executed with a D option that directs the processor 110 to extract all data in a ZIP image, build a directory structure, and store files within the directory structure. Self-extraction operations are performed without execution of any other program code.

The processor 110 sets a COMSPEC to equal the RAM-Drive location in an operation 338.

In an operation 340, the processor 110 assigns the "Y:" drive as the current operating system fundamental operational drive. The processor 110, in operation 342 executes an operating system bootstrap batch operation from the "Y:" drive, in an illustrative example by executing "Y:\BOOTWIN.BAT". Execution of the bootstrap batch operation that executes a CD stop operation (CDSTOP) in operation 344 which returns an El Torito remapped flexible disk drive back to the "A:" drive specification. If a flexible disk image, which is generally associated with the "A:" drive, is bootstrap loaded, the operating system operational drive is remapped to the CD-ROM and the "A:" drive is remapped to the "B:" drive. CDSTOP detects the remapped condition and restores the remapped condition to the original status so that the CD-ROM is modified from an operating system control device to a typical CD storage peripheral. Following execution of CDSTOP, the "A:" drive pointers are no longer directed to the CD-ROM drive and restored to point to the actual "A:" drive and El Torito operation is restored.

In an operation 346, the processor 110 executes the bootstrap loaded operating system from the alternative fundamental operational drive. In the illustrative embodiment, the processor 110 executes the Windows operating system from the "Y:" drive. The alternative operating system version executing from the alternative drive may or may not be custom-configured for a particular computer system platform. In one example, the alternative operating system version omits a standard program manager and instead incorporates a custom graphical user interface (GUI) and Web browser including a guide and configuration program directing a user to set up a server and server utilities.

In an operation 348, the processor 100 creates long file names that are suitable for usage by the Windows operating system for referencing long name files defined within the Windows operating system. Long file names are created because the operation 336 can only generate short file names under the DOS 8.3 specification and some files and directories are stored in the registry in long filename specification.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

For example, one embodiment of the method 200 for building an operating system that is bootable from an alternative device is highly advantageous in a computer manufacturing environment In the embodiment of the method 200, the operation 220 that makes other desired changes to the registry to support the bootable image on an alternative medium is modified to support the Build-to-Order manufacturing process. During the operation 216 of removing unnecessary directories and files, Windows hardware auto-detection functionality is removed. Windows auto-detection is heavily interactive with a user constrained to respond to many time-consuming, complex, and often arcane requests. In place of the Windows auto-detection functionality, a custom DOS-based configuration utility runs from a network link during diagnostic testing on the factory floor based on signals detected within the computer system so that interactive response is avoided. The configuration utility finds hardware components in the manufacturing environment, detects the installed hardware, determines the hardware/software configuration, runs diagnostic tests, writes pertinent configuration information to the registry, and returns status information to a control station via the network.

The method 200 for building an operating system that is bootable from an alternative device combined with the configuration utility yields a highly advantageous multi-threaded system which performs multiple operations at one time without waiting for another process to complete. A multi-threaded configuration detection and diagnostic system combined with bootstrap loading from a network link advantageously allows diagnostic testing in parallel on multiple communication devices, such as serial port testing concurrent with parallel port testing, and CPU testing. Diagnostic testing typically utilizes frequent rebooting of the operating system. The illustrative system advantageously supports full diagnostic testing of various devices in parallel, including initialization and control of the processor state by bootstrap loading, all performed automatically via network-communicated commands.

Although the embodiments are described as systems for bootstrap loading for the Windows 95 and Windows 98 operating systems, the invention is applicable with reference to other operating systems employing similar bootstrap loading measures, for example OS/2™.

What is claimed is:

1. A method of creating a bootable operating system image on a medium alternative to a persistent magnetic storage medium comprising:

creating an operating system image for subsequent transfer to an alternative bootable medium;

diverting bootstrap loading from the persistent magnetic storage medium to an alternative bootable medium;

creating a persistent bootable image and a non-persistent bootable image for usage on the alternative bootable medium;

modifying startup files to support bootstrap loading from the alternative bootable medium; and creating the alternative bootable medium.

2. A method according to claim 1 wherein:
the operation of creating an operating system image further includes:
installing the operating system on the persistent magnetic storage medium; and
transferring the installed operating system to an alternative directory.

3. A method according to claim 1 wherein:
the operation of creating an operating system image further includes:
creating a plurality of virtual drives on the persistent magnetic storage medium for multiple partition usage.

4. A method according to claim 1 wherein:
the operation of creating an operating system image further includes:
installing the operating system on the persistent magnetic storage medium; and
transferring the installed operating system to an alternative directory; and
diverting bootstrap loading from the persistent magnetic storage medium to an alternative bootable medium includes:
removing unnecessary directories and files from the alternative directory; and
changing a directory registry to otherwise support a bootable image on the alternative bootable medium.

5. A method according to claim 1 wherein:
creating an operating system image further includes:
installing the operating system on the persistent magnetic storage medium; and
transferring the installed operating system to an alternative directory;
diverting bootstrap loading from the persistent magnetic storage medium to an alternative bootable medium includes:
removing unnecessary directories and files from the alternative directory; and
changing a directory registry to otherwise support a bootable image on the alternative bootable medium; and
creating a persistent bootable image and a non-persistent bootable image on the alternative bootable medium includes:
making a self-extracting image of the alternative directory;
placing the self-extracting image in a root location of the alternative bootable medium; and
copying an image of the persistent bootable image to the alternative bootable medium.

6. A method according to claim 1 wherein:
modifying startup files to support bootstrap loading from the alternative bootable medium includes:
modifying an operating system control file to set data fields controlling a bootstrap process;
modifying a system configuration to load a plurality of aspects of operating system behavior; and
modifying a batch file to support the alternative bootable medium.

7. A method according to claim 1 wherein:
creating the alternative bootable medium includes:
making a sector image of a boot flexible diskette for usage as a bootstrap image; and
writing selected files to the alternative bootable medium.

8. A method according to claim 1 further comprising:
bootstrap loading an operating system from the alternative bootable medium.

9. A method according to claim 1 wherein:
the alternative bootable medium is a CD-ROM medium.

10. A method according to claim 1 wherein:
the alternative bootable medium is a plurality of signals communicated via a network link.

11. A computer program product including computer usable media having computable readable code embodied therein executing a method comprising:
creating an operating system image for subsequent transfer to an alternative bootable medium;
diverting bootstrap loading from the persistent magnetic storage medium to an alternative bootable medium;
creating a persistent bootable image and a non-persistent bootable image for usage on the alternative bootable medium;
modifying startup files to support bootstrap loading from the alternative bootable medium; and
creating the alternative bootable medium.

12. A method of bootstrap loading to a processor an operating system that is bootable from an image on a medium alternative to a persistent magnetic storage medium, the method comprising:
loading a system configuration file from the alternative bootable medium;
installing operating system control structures, files, controllers, and drivers;
redirecting legacy software code access operations;
copying a batch file to control bootstrap loading of the operating system to a virtual drive in system memory,
installing alternative bootable medium extensions to an extension file to assign a drive letter under DOS for the alternative bootable medium drive to a driver execution file;
substituting drive assignments to redirect operating system drive accesses to virtual drive accesses;
uncompressing a self-extracting operating system image to the virtual drive; and
assigning the virtual drive as the operating system fundamental operational drive.

13. A method according to claim 12 wherein:
the alternative medium is a CD-ROM medium.

14. A method according to claim 12 wherein:
the alternative bootable medium is a plurality of signals communicated via a network link.

15. A method according to claim 12 wherein:
the operation of loading a system configuration file further includes:
loading CONFIG.SYS from the alternative medium including:
enabling and disabling system features;
setting limits on resources; and
loading device drivers and control hardware.

16. A method according to claim 12 wherein:
installing operating system control structures, files, controllers, drivers includes:
installing HIMEM.SYS;
installing RAMDRIVE.SYS;
installing controllers and CD-ROM drivers; and
installing DOS and Windows drivers.

17. A method according to claim 12 wherein:
redirecting legacy software code access operations comprises:
creating a virtual drive in system memory;
querying a boot operating system to determine the drive letter for the virtual drive;
protecting against inadvertent write operations from legacy software code that attempts to write to a conventional operating system disk including:
redirecting the legacy writes to the virtual drive.

18. A method according to claim 12 wherein:
substituting drive assignments to redirect operating system drive accesses to virtual drive accesses includes:
querying a low level operating system to determine which drive letter is assigned to the alternative bootable medium;
receiving a response from the low level operating system;
checking the response drive letter to determine whether the response correctly matches the virtual drive letter; and
if the response drive letter is not the same as the virtual drive letter, executing a substitute drive command to substitute the drive letter current assigned to the virtual drive for the response driver letter, equating the virtual drive to the response drive letter.

19. A method according to claim 12 further comprising:
executing a bootstrap batch operation from a drive assigned as a current operating system fundamental operational drive.

20. A method according to claim 12 further comprising:
executing a bootstrap batch operation from a drive assigned as a current operating system fumdamental operational drive including:
assigning the virtual drive as the current operating system fundamental operational drive; and
executing an operating system bootstrap batch operation from the virtual drive.

21. A method according to claim 12 further comprising:
executing a bootstrap loaded operating system from the alternative fundamental operational drive.

22. A method according to claim 12 wherein:
the method bootstrap loads and runs a Windows graphical user interface (GUI) although a Windows operating system (OS) is not installed on the processor.

23. A computer program product including computer usable media having computable readable code embodied therein executing a method comprising:
providing a processor with an operating system that is bootable from an image on a medium alternative to a persistent magnetic storage medium;
loading a system configuration file from the alternative bootable medium;
installing operating system control structures, files, controllers, and drivers;
redirecting legacy software code access operations;
copying a batch file to control bootstrap loading of the operating system to a virtual drive in system memory;
installing alternative bootable medium extensions to an extension file to assign a drive letter under DOS for the alternative bootable medium drive to a driver execution file;
substituting drive assignments to redirect operating system drive accesses to virtual drive accesses;
uncompressing a self-extracting operating system image to the virtual drive; and
assigning the virtual drive as the operating system fundamental operational drive.

24. A computer program product including computer usable media having computable readable code embodied therein comprising:
a computing system including:
a target processor;
a Random-Access Memory (RAM) coupled to the target processor; and
an executable program code that is executable on the target processor and bootstrap loads and runs a program from a CD-ROM medium when an operating system associated with the program is not installed for execution on the target processor, the executable program code including:
a routine for creating a RAM-drive in the RAM; and
a routine that substitutes a designator of the RAM-Drive in place of predefined drive designators that are hard-coded into base code in the operating system.

25. A computer program product according to claim 24 wherein:
the program is an application program or an interface.

26. A computer program product including computer usable media having computable readable code embodied therein comprising:
an executable code that is stored on and accessed from a CD-ROM, the executable code including:
a designator directed to address a nonpersistent storage on a RAM-Drive and to address a persistent storage on the CD-ROM, the designators being found by substituting an alternative file structure for a conventional file structure, changing registry entries from the conventional file structure to a known location in the alternative file structure, and allocating nonpersistent operating system files to the RAM-Drive and persistent operating system files to the CD-ROM.

27. A computer system comprising:
a processor;
a CD-ROM drive coupled to the processor;
a Random-Access Memory (RAM) coupled to the processor;
a persistent memory coupled to the processor; and
an executable program code that is stored in the persistant memory and executable on the processor and that loads and runs a graphical user interface functionality when an operating system associated with the graphical user interface is not installed to execute on the processor, wherein the executable program code:
creates a RAM-Drive in the RAM; and
substitutes a designator of the RAM-Drive in place of predefined drive designators that are hard-coded into base code of the operating system.

28. A computer system according to claim 27 wherein the executable program code:
disables functionalities of the operating system that interfere with operating system operations arising from the RAM-Drive.

29. A computer system according to claim 28 wherein:
functionalities of the operating system that are disabled are selected from among:
a functionality of auto-detecting hardware;
a functionality of preloading the operating system registry at boot time;
a functionality of writing boot log files to a boot medium; and
a functionality of allowing an end user to use function keys to change the bootstrap process.

30. A computer system according to claim 27 wherein the executable program code:
modifies a registry in the operating system to permit storage of data on the RAM-Drive and to execute applications from the CD-ROM.

31. A computer system according to claim 27 wherein the executable program code:
redirects the operating system to use the RAM-Drive rather than a persistent magnetic storage for performing operating system functionality.

32. A computer system according to claim 27 wherein the executable program code:
uses a substitute command to redirect accesses from a hard-coded operating system directory to an alternative directory on the RAM-Drive via changes made in an operating system registry.

33. A computer system system comprising:
a processor;
an operating system that is conventionally loaded to a persistent magnetic storage medium coupled to the processor;
an alternative bootable medium coupled to the processor;
a persistent memory coupled to the processor,
an executable program code that is stored in the persistant memory and executable on the processor and that loads and runs a graphical user interface functionality when the operating system associated with the graphical user interface is not installed in the processor to execute on the processor; and
a computer system configuration utility that is executable on the processor,
wherein:
the executable program code and the computer system configuration utility, in combination, form a multi-threaded system which performs multiple operations at one time.

34. A computer system system comprising:
a processor;
an operating system that is conventionally loaded to a persistent magnetic storage medium coupled to the processor;
an alternative bootable medium coupled to the processor;
a persistent memory coupled to the processor,
an executable program code that is stored in the persistant memory and executable on the processor and that loads and runs a graphical user interface functionality when the operating system associated with the graphical user interface is not installed in the processor to execute on the processor; and
a computer system configuration utility that is executable on the processor,
wherein:
the computer system configuration utility includes a diagnostic tester that performs diagnostic testing in parallel on multiple communication devices.

35. A computer system according to claim 34, wherein:
the computer system configuration utility supports diagnostic testing of a plurality of devices in parallel, including initialization and control of the processor state by bootstrap loading.

36. A computer system comprising:
a processor;
an operating system that is conventionally loaded to a persistent magnetic storage medium coupled to the processor;
an alternative bootable medium coupled to the processor;
a persistent memory coupled to the processor,
an executable program code that is stored in the persistant memory and executable on the processor and that loads and runs a graphical user interface functionality when the operating system associated with the graphical user interface is not installed in the processor to execute on the processor; and
a computer system configuration utility that is executable on the processor,
wherein:
the executable program code and the computer system configuration utility, in combination, execute via network-communicated commands.

* * * * *